US009441345B2

(12) United States Patent
Sugiyama

(10) Patent No.: US 9,441,345 B2
(45) Date of Patent: Sep. 13, 2016

(54) HYBRID EXCAVATOR AND METHOD OF CONTROLLING HYBRID EXCAVATOR

(71) Applicant: SUMITOMO HEAVY INDUSTRIES, LTD., Tokyo (JP)

(72) Inventor: Yuta Sugiyama, Kanagawa (JP)

(73) Assignee: SUMITOMO HEAVY INDUSTRIES, LTD., Tokyo (JP)

( * ) Notice: Subject to any disclaimer, the term of this patent is extended or adjusted under 35 U.S.C. 154(b) by 184 days.

(21) Appl. No.: 14/251,704

(22) Filed: Apr. 14, 2014

(65) Prior Publication Data

US 2014/0222274 A1 Aug. 7, 2014

Related U.S. Application Data

(63) Continuation of application No. PCT/JP2012/077142, filed on Oct. 19, 2012.

(30) Foreign Application Priority Data

Oct. 26, 2011 (JP) ................................ 2011-235189

(51) Int. Cl.
*B60L 9/00* (2006.01)
*B60L 11/00* (2006.01)
(Continued)

(52) U.S. Cl.
CPC ............ *E02F 9/2025* (2013.01); *B60W 20/13* (2016.01); *E02F 9/123* (2013.01); *E02F 9/2075* (2013.01); *E02F 9/2091* (2013.01); *E02F 9/2095* (2013.01); *E02F 9/2217* (2013.01); *H02J 7/0022* (2013.01); *H02J 7/1423* (2013.01); *H02J 7/1492* (2013.01); *H02J 7/345* (2013.01); *Y02T 10/92* (2013.01); *Y10S 903/903* (2013.01)

(58) Field of Classification Search
CPC ..... E02F 9/123; E02F 9/2025; E02F 9/2075; E02F 9/2091; E02F 9/2095; E02F 9/2217; E02F 9/2246; H02J 7/345; H02J 7/0054; H02J 2007/0037; H01M 10/44; H01M 10/48; B60W 20/00; B60W 2300/17; B60W 2300/244; B60W 2300/248; B60Y 2200/412; B60Y 2200/41; B60Y 2200/92; B60Y 2400/0037
USPC .......................... 701/22; 180/65.265, 65.285
See application file for complete search history.

(56) References Cited

U.S. PATENT DOCUMENTS 6,124,690 A * 9/2000 Yano ........................ B60K 6/28 180/65.26
6,635,973 B1 * 10/2003 Kagoshima ........... E02F 9/2075 307/10.1
6,966,803 B2 * 11/2005 Hara ........................ B60K 6/48 180/65.25

(Continued)

FOREIGN PATENT DOCUMENTS

JP 2009-191463 8/2009
JP 2010-133237 6/2010

(Continued)

OTHER PUBLICATIONS

International Search Report mailed on Jan. 29, 2013.

*Primary Examiner* — Jason Holloway
*Assistant Examiner* — Rachid Bendidi
(74) *Attorney, Agent, or Firm* — IPUSA, PLLC

(57) ABSTRACT

A hybrid excavator includes a control unit that is arranged at an upper turning body and is configured to supply a drive signal to at least one of a motor generator control part and a charge/discharge control part. During a regeneration operation performed by a motor, the control unit sets an electrical energy storage target value for a second electrical energy storage device to a higher value than an electrical energy storage target value for a first electrical energy storage.

12 Claims, 6 Drawing Sheets

(51) Int. Cl.

| | |
|---|---|
| ***G05D 1/00*** | (2006.01) |
| ***G05D 3/00*** | (2006.01) |
| ***G06F 7/00*** | (2006.01) |
| ***G06F 17/00*** | (2006.01) |
| ***E02F 9/20*** | (2006.01) |
| ***H02J 7/00*** | (2006.01) |
| ***H02J 7/14*** | (2006.01) |
| ***E02F 9/12*** | (2006.01) |
| ***E02F 9/22*** | (2006.01) |
| *H02J 7/34* | (2006.01) |

(56) References Cited

U.S. PATENT DOCUMENTS 7,388,301 B2 * 6/2008 Komiyama .......... E02F 9/0866 180/312
2004/0148817 A1 * 8/2004 Kagoshima .............. B60K 6/12 37/348
2004/0210356 A1 * 10/2004 Wilton .................. B60L 3/0046 701/22
2009/0024265 A1 * 1/2009 Kortschak .............. B60K 6/485 701/22
2010/0156180 A1 * 6/2010 Nishiyama .............. H02J 7/345 307/46
2010/0270095 A1 10/2010 Shono et al.
2011/0251746 A1 10/2011 Wu et al.
2012/0082536 A1 * 4/2012 Kawashima .......... B60W 10/08 414/694

FOREIGN PATENT DOCUMENTS

JP WO 2010143628 A1 * 12/2010 ............ B60W 10/08
WO WO 2009/082010 7/2009

* cited by examiner 1
2
3
4
5
6
7
8
9
10

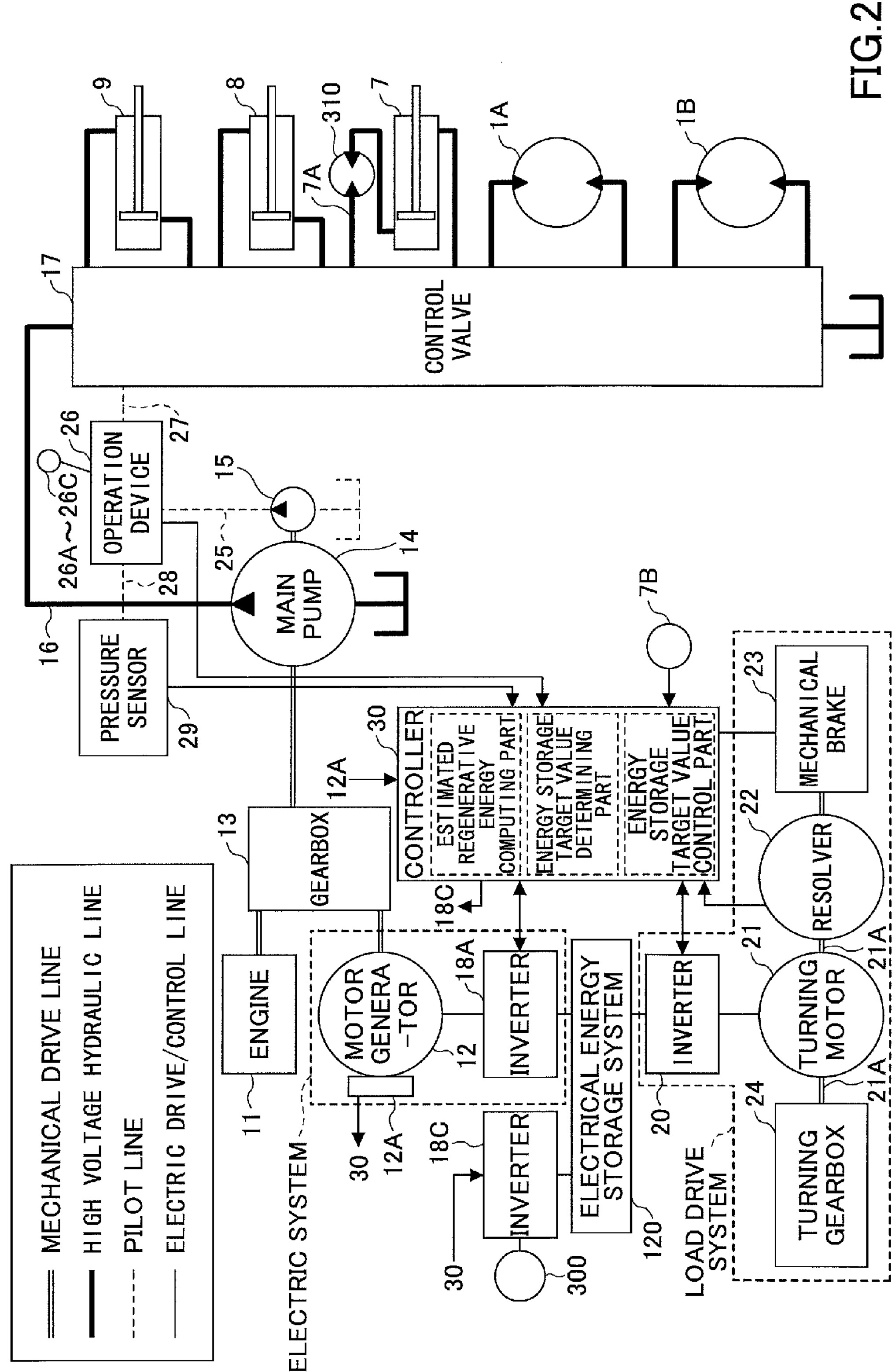
MECHANICAL DRIVE LINE
HIGH VOLTAGE HYDRAULIC LINE
PILOT LINE
ELECTRIC DRIVE/CONTROL LINE
CONTROL VALVE
OPERATION DEVICE
MAIN PUMP
PRESSURE SENSOR
GEARBOX
ENGINE
MOTOR GENERA -TOR
INVERTER
INVERTER
INVERTER
ELECTRICAL ENERGY STORAGE SYSTEM
CONTROLLER
ESTIMATED REGENERATIVE ENERGY COMPUTING PART
ENERGY STORAGE TARGET VALUE DETERMINING PART
ENERGY STORAGE TARGET VALUE CONTROL PART
MECHANICAL BRAKE
RESOLVER
TURNING MOTOR
TURNING GEARBOX
ELECTRIC SYSTEM
LOAD DRIVE SYSTEM
FIG.2

30
CONTROLLER
111,112,113
102A,102B
18A,18C,20
INV
120
110
107
30
111
Vdc
V
106
106
100
102b
102a
102B
102A
30
101
30
104
104
30
Ic
113
30
112
Vcap
V
19
Rc
Vc

HYBRID EXCAVATOR AND METHOD OF CONTROLLING HYBRID EXCAVATOR

RELATED APPLICATION

The present application is a continuation application filed under 35 U.S.C. 111(a) claiming benefit under 35 U.S.C. 120 and 365(c) of PCT International Application No. PCT/JP2012/077142 filed on Oct. 19, 2012 and designating the U.S., which claims priority to Japanese Patent Application No. 2011-235189 filed on Oct. 26, 2011. The entire contents of the foregoing applications are incorporated herein by reference.

BACKGROUND

1. Technical Field

The present invention relates to a hybrid excavator that charges an electrical energy storage device with regenerative power generated by an electric load.

2. Description of Related Art

Generally, in hybrid excavators, a DC bus is positioned between an electric load and an electrical energy storage device corresponding to a power supply, and electric power is supplied to the electric load via the DC bus. By controlling the voltage of the DC bus using an up-down voltage converter, a supply of electric power from the electrical energy storage device (discharge) and a supply of electric power to the electrical energy storage device (charge) may be controlled.

The voltage of the DC bus varies depending on the operating state of the electric load. Considering demands to improve the efficiency of the up-down voltage converter, the voltage of the DC bus is preferably positioned to fall within a certain range. Accordingly, an electrical energy storage unit is known that includes a constant voltage electrical energy storage part which maintains a voltage level within a fixed range, and a variable voltage electrical energy storage part which permits variations in the voltage level due to motor power regenerating operations of the electric load.

SUMMARY

According to one embodiment of the present invention, a hybrid excavator is provided that includes a lower running body; an upper turning body that is positioned on the lower running body; a boom including one end that is rotatably attached to the upper turning body; an engine that is positioned at the upper turning body; a motor generator that is positioned at the upper turning body and is configured to perform an assist operation for the engine and an electric power generating operation using the engine; a motor generator control part that is configured to control the motor generator in response to a switching control signal supplied from a control unit; a first electrical energy storage device that is positioned at the upper turning body; a second electrical energy storage device that is positioned at the upper turning body and is electrically connected to the motor generator control part; a charge/discharge control part that is positioned at the upper turning body and is configured to control a charge/discharge operation between the first electrical energy storage device and the second electrical energy storage device in response to an externally supplied control command signal; a motor that is positioned at the upper turning body and is electrically connected to the second electrical energy storage device; and the control unit that is configured to supply a control signal to at least one of the motor generator control part and the charge/discharge control part. The motor is configured to perform a regeneration operation for generating electric energy from mechanical energy and store the electric energy generated by the regeneration operation in the second electrical energy storage device. The control unit is configured to set a second electrical energy storage target value for the second electrical energy storage device to a higher value than a first electrical energy storage target value for the first electrical energy storage device during the regeneration operation performed by the motor.

According to another embodiment of the present invention, a method of controlling a hybrid excavator is provided. The hybrid excavator includes a lower running body; an upper turning body that is positioned on the lower running body; a boom including one end that is rotatably attached to the upper turning body; an engine that is positioned at the upper turning body; a motor generator that is positioned at the upper turning body and is configured to perform an assist operation for the engine and an electric power generating operation using the engine; a motor generator control part that is configured to control the motor generator in response to a switching control signal supplied from a control unit; a first electrical energy storage device that is positioned at the upper turning body; a second electrical energy storage device that is positioned at the upper turning body and is electrically connected to the motor generator control part; a charge/discharge control part that is positioned at the upper turning body and is configured to control a charge/discharge operation between the first electrical energy storage device and the second electrical energy storage device in response to an externally supplied control command signal; and a motor that is positioned at the upper turning body and is electrically connected to the second electrical energy storage device, the motor being configured to perform a regeneration operation for generating electric energy from mechanical energy and store the electric energy generated by the regeneration operation in the second electrical energy storage device. The method of controlling the hybrid excavator includes supplying a drive control signal to at least one of the motor generator control part and the charge/discharge control part, and setting a second electrical energy storage target value for the second electrical energy storage device to a higher value than a first electrical energy storage target value for the first electrical energy storage device during the regeneration operation performed by the motor.

BRIEF DESCRIPTION OF THE DRAWINGS

FIG. 2 is a block diagram illustrating a configuration of a drive system of a hybrid excavator according to one exemplary embodiment;

DETAILED DESCRIPTION

Figure 1:
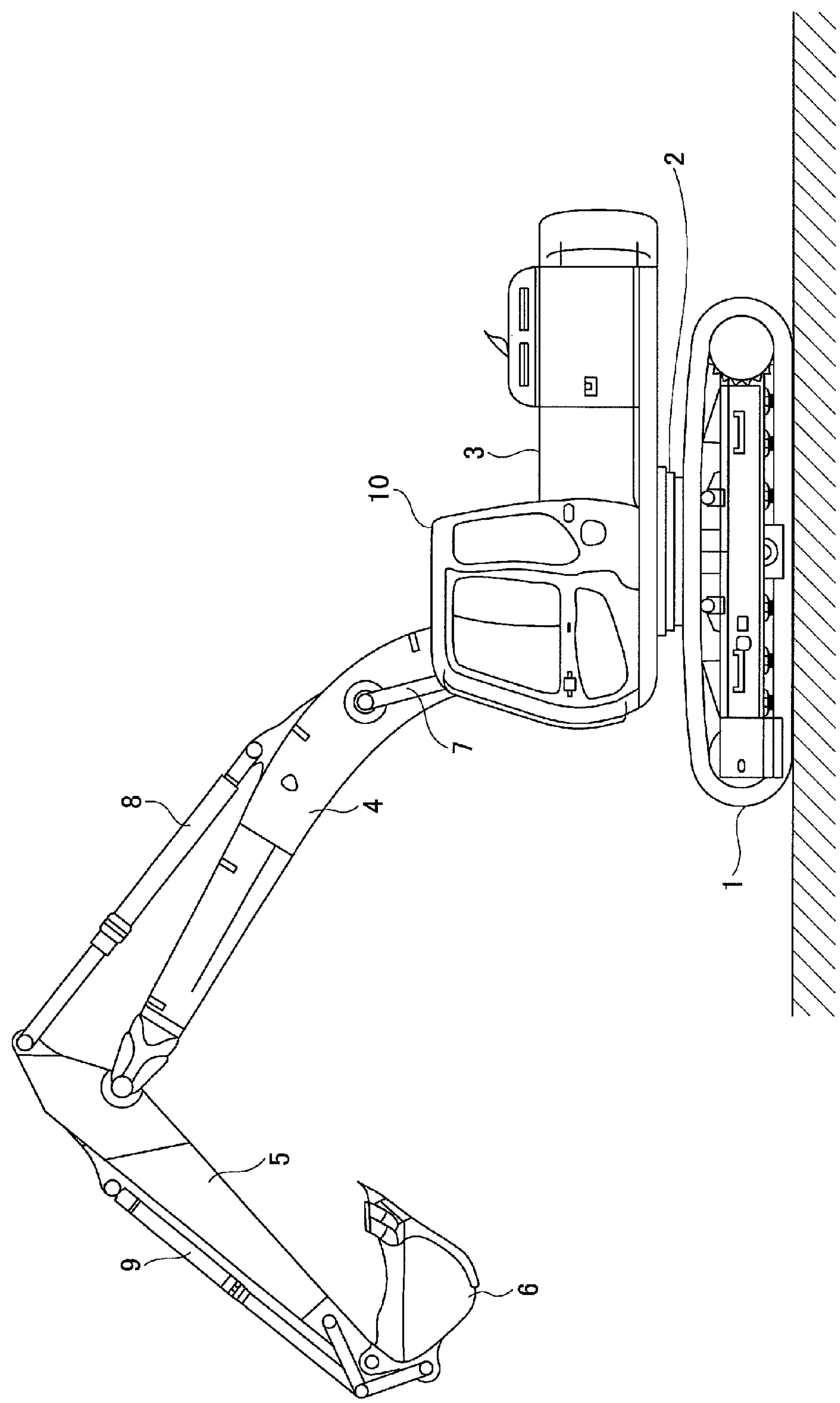
FIG. 1 is a side view of a hybrid excavator.

The voltage conversion efficiency of an up-down voltage converter may generally be higher as the voltage conversion ratio (electrical energy storage device voltage/DC bus voltage) comes closer to one (1). Accordingly, the DC bus voltage is preferably controlled to a value that is higher than the electrical energy storage device voltage but close to the electrical energy storage device voltage. Because the electrical energy storage device voltage varies depending on the discharge/charge state of the electrical energy storage device, the DC bus voltage has to be controlled in view of the variation range of the electrical energy storage device voltage.

Considering demands to reduce manufacturing costs and installation space of the electrical energy storage device, the electrical energy storage device is preferably positioned to have a relatively small capacity. However, when an electrical energy storage device with a small capacity is used, the energy storage capacity of the electrical energy storage device is reduced. As a result, the electrical energy storage device voltage may decrease to a lower limit within a short period of time upon discharge, and the electrical energy storage device voltage may increase to an upper limit within a short period of time upon charge. Thus, the voltage variation range of the electrical energy storage device voltage is increased.

Also, the internal resistance of the electrical energy storage device increases in inverse proportion to a decrease in energy storage capacity of the electrical energy storage device. Thus, when the electrical energy storage device has a small capacity, the internal resistance of the electrical energy storage device is increased. When the internal resistance of the electrical energy storage device is increased, internal resistance loss is increased and the charge/discharge efficiency of the electrical energy storage device is decreased. Further, control operations may become unstable due to a voltage decrease caused by the internal resistance of the electrical energy storage device, for example.

In light of the above, there is a demand for a hybrid excavator that is capable of stably controlling an up-down voltage converter within a high-efficiency range while using an electrical energy storage device with a relatively small capacity. There is also a demand for a method for controlling such a hybrid excavator.

According to one embodiment of the present invention, a hybrid excavator includes a lower running body; an upper turning body that is positioned on the lower running body; a boom including one end that is rotatably attached to the upper turning body; an engine that is positioned at the upper turning body; a motor generator that is positioned at the upper turning body and is configured to perform an assist operation for the engine and an electric power generating operation using the engine; a motor generator control part that is configured to control the motor generator in response to a switching control signal supplied from a control unit; a first electrical energy storage device that is positioned at the upper turning body; a second electrical energy storage device that is positioned at the upper turning body and is electrically connected to the motor generator control part; a charge/discharge control part that is positioned at the upper turning body and is configured to control a charge/discharge operation between the first electrical energy storage device and the second electrical energy storage device in response to an externally supplied control command signal; a motor that is positioned at the upper turning body and is electrically connected to the second electrical energy storage device; and the control unit that is configure to supply a control signal to at least one of the motor generator control part and the charge/discharge control part. The motor is configured to perform a regeneration operation for generating electric energy from mechanical energy and store the electric energy generated by the regeneration operation in the second electrical energy storage device. The control unit is configured to set a second electrical energy storage target value for the second electrical energy storage device to a higher value than a first electrical energy storage target value for the first electrical energy storage device during the regeneration operation performed by the motor.

According to another embodiment of the present invention, a method of controlling a hybrid excavator includes supplying a drive control signal to at least one of the motor generator control part and the charge/discharge control part, and setting a second electrical energy storage target value for the second electrical energy storage device to a higher value than a first electrical energy storage target value for the first electrical energy storage device during the regeneration operation performed by the motor.

According to one aspect of the present invention, an up-down voltage converter may be stably controlled within a high-efficiency range while using an electrical energy storage device with a relatively small capacity.

In the following, certain illustrative embodiments of the present invention are described with reference to the accompanying drawings.

FIG. 1 is a side view of a hybrid excavator as an example of a hybrid construction machine to which an embodiment of the present invention may be applied.

An upper turning body 3 is mounted, via a turning mechanism 2, on the lower running body 1 of the hybrid excavator illustrated in FIG. 1. A boom 4 is attached to the upper turning body 3. An arm 5 is attached at the end of the boom 4. A bucket 6 is attached at the end of the arm 5. The boom 4, the arm 5, and the bucket 6 are hydraulically driven by a boom cylinder 7, an arm cylinder 8, and a bucket cylinder 9, respectively. A cabin 10 is positioned at the upper turning body 3, and a power source, such as an engine, is mounted to the upper turning body 3.

FIG. 2 is a block diagram illustrating a configuration of a drive system of the hybrid excavator illustrated in FIG. 1. In FIG. 2, the double line denotes a mechanical drive line, the thick solid line denotes a high voltage hydraulic line, the dotted line denotes a pilot line, and the thin solid line denotes an electric drive/control line.

An engine 11 as a mechanical drive part and a motor generator 12 as an assist drive part are connected to two input axes of a gearbox 13. A main pump 14 corresponding to a hydraulic pump and a pilot pump 15 are connected to the output axis of the gearbox 13. A control valve 17 is connected to the main pump 14 via a high voltage hydraulic line 16.

The control valve 17 is a control unit that controls a hydraulic system of the hybrid excavator. A hydraulic motor 1A (for the right side) and a hydraulic motor 1B (for the left side) are provided for driving the lower running body 1. The hydraulic motors 1A and 1B, the boom cylinder 7, the arm cylinder 8, and the bucket cylinder 9 are connected to the control valve 17 via the high voltage hydraulic line.

An electrical energy storage system 120 including a capacitor as an electrical energy storage device is connected to the motor generator 12 via an inverter 18A. A turning motor 21 as an electric work element is connected to the electrical energy storage system 120 via an inverter 20. A resolver 22, a mechanical brake 23, and a turning gearbox 24 are connected to the axis of rotation 21A of the turning motor 21. An operation device 26 is connected to the pilot pump 15 via the pilot line 25. The turning motor 21, the inverter 20, the resolver 22, the mechanical brake 23, and the turning gearbox 24 make up a load drive system.

The operation device 26 includes a lever 26A, a lever 26B, and a pedal 26C. The lever 26A, the lever 26B, and the pedal 26C are each connected to the control valve 17 via a hydraulic line 27 and a voltage sensor 29 via a hydraulic line 28. The voltage sensor 29 is connected to a controller 30, which performs drive control of an electric system.

In the present embodiment, a boom regeneration motor 300 (also referred to as "generator 300") for obtaining boom regeneration power is connected to the electrical energy storage system 120 via an inverter 18C. The generator 300 is driven by a hydraulic motor 310, which is driven by a hydraulic fluid discharged from the boom cylinder 7. The generator 300 converts the potential energy of the boom 4 into electrical energy by using the voltage of the hydraulic fluid discharged from the boom cylinder 7 when the boom 4 is lowered by gravity. Note that in FIG. 2, the hydraulic motor 310 and the generator 300 are illustrated at separate locations for the sake of convenience of description. However, in practical applications, the axis of rotation of the generator 300 is mechanically connected to the axis of rotation of the hydraulic motor 310.

That is, the hydraulic motor 310 is positioned to be rotated by the hydraulic fluid that is discharged from the boom cylinder 7 when the boom 4 is lowered. The hydraulic motor 310 is configured to convert the energy generated when the boom 4 is lowered by gravity into a rotational force. The hydraulic motor 310 is positioned in a hydraulic pipe 7A between the control valve 17 and the boom cylinder 7. The hydraulic motor 310 may be attached to a suitable location within the upper turning body 3.

The electric power generated by the generator 300 is supplied to the electrical energy storage system 120 through the inverter 18C as regenerative power. The generator 300 and the inverter 18C make up a load drive system.

In the present embodiment, a boom angle sensor 7B for detecting the angle of the boom 4 is attached to a support shaft of the boom 4. The boom angle sensor 7B supplies the detected boom angle θB to the controller 30.

Figure 3:
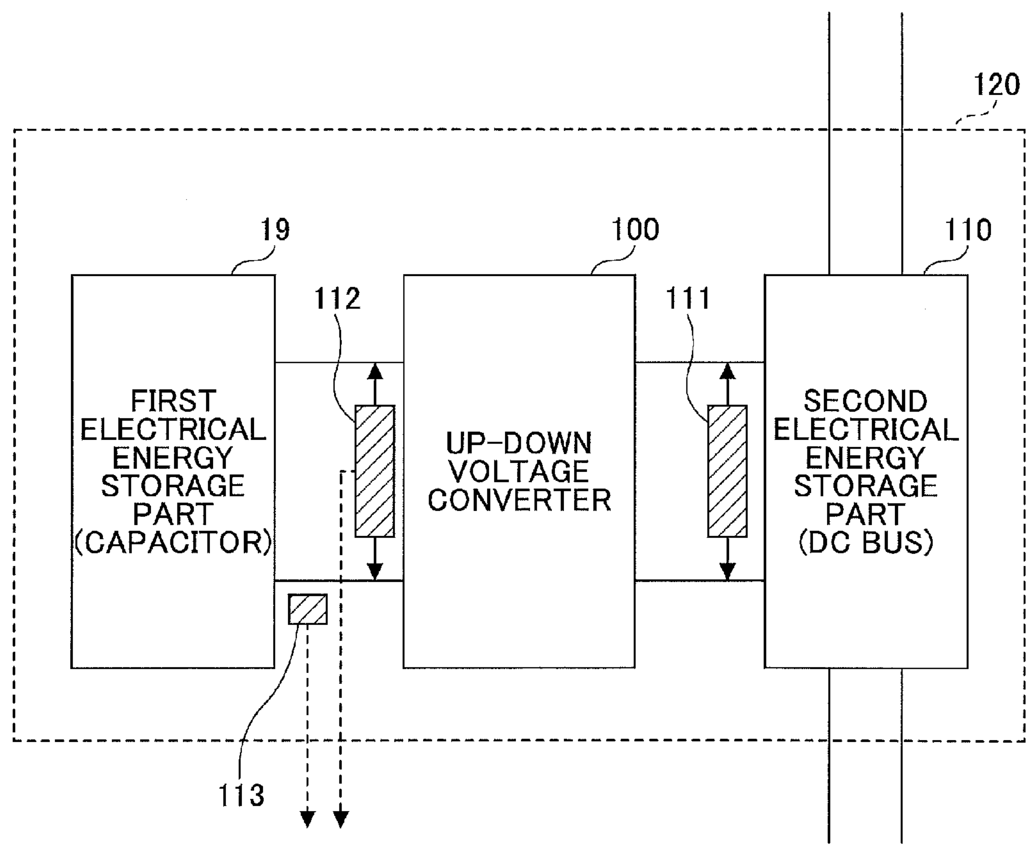
FIG. 3 is a block diagram illustrating a configuration of an electrical energy storage system.

FIG. 3 is a block diagram illustrating a configuration of the electrical energy storage system 120. The electrical energy storage system 120 includes a capacitor 19 as a first electrical energy storage part, an up-down voltage converter 100, and a DC bus 110. The DC bus 110 corresponds to a second electrical energy storage part that controls transfer of electric power between the capacitor 19 corresponding to the first electrical energy storage part, the motor generator 12, and the turning motor 21. A capacitor voltage detecting part 112 for detecting a capacitor voltage value and a capacitor current detecting part 113 for detecting a capacitor current value are positioned at the capacitor 19. The capacitor voltage value and the capacitor current value detected by the capacitor voltage detecting part 112 and the capacitor current detecting part 113 are supplied to the controller 30.

The up-down voltage converter 100 controls switching between a voltage raising operation and a voltage lowering operation according to the operating states of the motor generator 12, the generator 300, and the turning motor 21 so that the DC bus voltage value falls within a certain range. The DC bus 110 corresponding to the second electrical energy storage part is positioned between the inverters 18A, 18C, and 20 and the up-down voltage converter 100, and is configured to transfer electric power between the capacitor 19, the motor generator 12, the generator 300, and the turning motor 21.

Referring back to FIG. 2, the controller 30 corresponds to a control unit that acts as a main control part performing drive control of the hybrid excavator. The controller 30 may be a processor unit including a CPU (central processing unit) and an internal memory. The functions of the controller 30 may be implemented by the CPU executing a drive control program stored in the internal memory.

The controller 30 converts a signal received from the voltage sensor 29 into a speed command, and performs drive control of the turning motor 21 using the speed command. The signal received from the voltage sensor 29 is equivalent to the signal indicating the operational amount when the operation device 26 is operated to turn the turning mechanism 2.

The controller 30 controls operations of the motor generator 12 (switching between an assist operation and a power generating operation), and controls operations of the up-down voltage converter 100 as the voltage raising/lowering control unit to control charging/discharging of the capacitor 19. The controller 30 controls switching of the voltage raising operation and the voltage lowering operation of the up-down voltage converter 100 based on the charge state of the capacitor 19, the operating state of the motor generator 12 (assist operation or power generating operation) and the operating state (power running operation or regeneration operation) of the turning motor 21. In this way the controller 30 controls charging/discharging of the capacitor 19.

The switching control between the voltage raising operation and the voltage lowering operation of the up-down voltage converter 100 is carried out based on the DC bus voltage value detected by the DC bus voltage detecting part 111, the capacitor voltage value detected by the capacitor voltage detecting part 112, and the capacitor current value detected by the capacitor current detecting part 113.

In the above-described configuration, the power generated by the motor generator 12 corresponding to an assist motor is supplied to the DC bus 110 of the electrical energy storage system 120 via the inverter 18A, and supplied to the capacitor 19 via the up-down voltage converter 100. The regenerative power obtained by the regeneration operation of the turning motor 21 is supplied to the DC bus 110 of the electrical energy storage system 120 via the inverter 20, and supplied to the capacitor 19 via the up-down voltage converter 100. The power generated by the boom regeneration motor 300 is supplied to the DC bus 110 of the electrical energy storage system 120 via the inverter 18C, and supplied to the capacitor 19 via the up-down voltage converter 100.

The turning speed (the angular velocity ω) of the turning motor 21 is detected by the resolver 22. The angle (the boom angle θB) of the boom 4 is detected by the boom angle sensor 7B, which may be a rotary encoder positioned at the support shaft of the boom 4, for example. The controller 30 computes an estimated turning regenerative power (energy) based on the angular velocity ω of the turning motor 21, and computes an estimated boom regenerative power (energy) based on the boom angle θB. Based on the estimated turning regenerative power and the estimated boom regenerative power obtained through such computations, the controller 30 computes (determines) an expected regeneration target value (electrical energy storage target value) for the SOC (state of charge) of the capacitor 19. The controller 30 controls the respective parts of the hybrid excavator so that the SOC of the capacitor 19 comes close to the computed expected regeneration target value.

Figure 4:
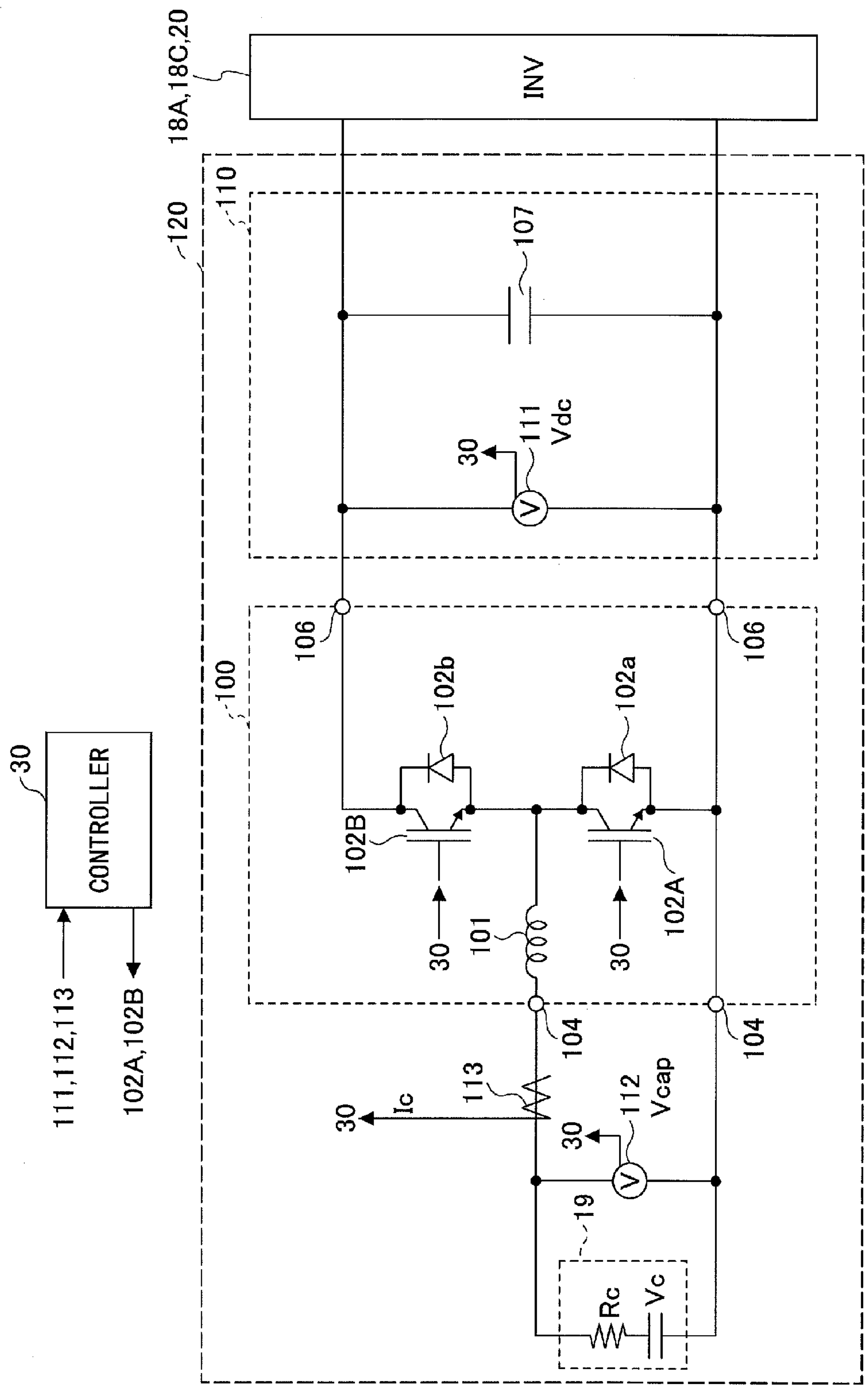
FIG. 4 is a circuit diagram of the electrical energy storage system.

FIG. 4 is a circuit diagram of the electrical energy storage system 120. In FIG. 4, the capacitor 19 is schematically illustrated as an equivalent circuit including an internal resistance component and a capacitance component. The up-down voltage converter 100 includes a reactor 101, a voltage raising IGBT (insulated gate bipolar transistor) 102A, a voltage lowering IGBT 102B, a pair of power supply connection terminals 104 for connecting the capacitor 19, a pair of output terminals 106 for connecting the DC bus 110, and a smoothing capacitor 107 connected in parallel to the output terminals 106. The DC bus 110 is connected between the output terminals 106 of the up-down voltage converter 100 and the inverters 18A, 18C, and 20.

One end of the reactor 101 is connected to a midpoint between the voltage raising IGBT 102A and the voltage lowering IGBT 102B, and the other end of the reactor 101 is connected to one of the power supply connection terminals 104. The reactor 101 is positioned to supply an induced electromotive force that is generated upon switching ON/OFF the voltage raising IGBT 102A to the DC bus 110.

Each of the voltage raising IGBT 102A and the voltage lowering IGBT 102B is formed by a bipolar transistor incorporating a MOSFET (metal oxide semiconductor field effect transistor) at a gate portion. Each of the voltage raising IGBT 102A and the voltage lowering IGBT 102B is a semiconductor element that is capable of switching large electric power at high speed. Each of the voltage raising IGBT 102A and the voltage lowering IGBT 102B is driven by the controller 30 supplying a PWM voltage to the gate terminal. A diode 102*a* and a diode 102*b*, which are rectifier elements, are connected in parallel to the voltage raising IGBT 102A and the voltage lowering IGBT 102B, respectively.

The capacitor 19 may be a chargeable and dischargeable capacitor that enables transfer of electric power between the capacitor 19 and the DC bus 110 via the up-down voltage converter 100. Note that although the capacitor 19 is illustrated as an example of the first electrical energy storage part in FIG. 4, a chargeable and dischargeable secondary battery, such as a lithium ion battery, a lithium ion capacitor, or some other form of power supply that can deliver and receive electric power may be used instead of the capacitor 19.

The power supply connection terminals 104 and the output terminals 106 are terminals to which the capacitor 19 and the inverters 18A, 180, and 20 are connected. The capacitor voltage detecting part 112 for detecting the capacitor voltage value is connected between the power supply connection terminals 104. The DC bus voltage detecting part 111 for detecting the DC bus voltage value is connected between the output terminals 106.

The capacitor voltage detecting part 112 detects the capacitor voltage Vcap of the capacitor 19. The DC bus voltage detecting part 111 detects the voltage of the DC bus 110 (DC bus voltage: Vdc). The smoothing capacitor 107 is an electrical energy storage element that is inserted between the positive-electrode terminal and the negative-electrode terminal of the output terminals 106 and is configured to smooth the DC bus voltage. The voltage of the DC bus 110 is maintained at a predetermined voltage by the smoothing capacitor 107. The capacitor current detecting part 113 is a detecting part for detecting the value of the current that flows through the capacitor 19. The capacitor current detecting part 113 includes a resistor for current detection. The capacitor current detecting part 113 detects the current value Ic of the current flowing through the capacitor 19.

When raising the voltage of the DC bus 110 with the up-down voltage converter 100, a PWM voltage is supplied to the gate terminal of the voltage raising IGBT 102A, and the induced electromotive force generated at the reactor 101 in response to switching ON/OFF the voltage raising IGBT 102A is supplied to the DC bus 110 through the diode 102*b* connected in parallel to the voltage lowering IGBT 102B. In this way, the voltage of the DC bus 110 is increased.

When lowering the voltage of the DC bus 110 by the up-down voltage converter 100, a PWM voltage is supplied to the gate terminal of the voltage lowering IGBT 102B, and the regeneration power supplied via the voltage lowering IGBT 102B and the DC bus 110 is supplied from the DC bus 110 to the capacitor 19. In this way, the capacitor 19 is charged by the power stored in the DC bus 110 and the voltage of the DC bus 110 is lowered.

In practical applications, a drive part, which generates the PWM signal for driving the voltage raising IGBT 102A and the voltage lowering IGBT 102B, is positioned between the controller 30 and each of the voltage raising IGBT 102A and the voltage lowering IGBT 102B. However, the illustration of the drive part is omitted in FIG. 4. Such a drive part may be implemented by either an electronic circuit or a processor unit.

In the hybrid excavator described above, by maintaining the SOC of the capacitor 19 at a high level, an electric load may be driven in an energy-efficient manner by the electric power from the capacitor 19 corresponding to an electrical energy storage device.

In the case of using an electrical energy storage device with a small energy storage capacity for the purpose of miniaturizing the electrical energy storage device and reducing the cost of the electrical energy storage system, the amount of electric power that can be stored in the electrical energy storage device may be increased by setting a target SOC for the electrical energy storage device to a high level. For example, in the case where a capacitor is used as the electrical energy storage device, a small capacitor may be used and the target SOC for the capacitor may be set to a high level. In this way, the capacitor may be miniaturized without causing a substantial reduction in the energy storage capacity.

In view of the charge amount and charge rate of the electrical energy storage device and the operating state of the drive part of the drive system of the hybrid excavator, the SOC of the electrical energy storage device should be less than or equal to 90% to enable proper operations under normal circumstances. Thus, by setting the target SOC for the electrical energy storage device to 90%, an electric load may be efficiently driven at a high voltage, and at the same time, the electrical energy storage device may be miniaturized to reduce costs.

However, in the case where the capacity of the capacitor 19 is reduced, the internal resistance Rc of the capacitor 19 increases in inverse proportion to the decrease in capacity of the capacitor 19, and as a result, a voltage drop (Rc·IC) upon charge/discharge is increased. The capacitor voltage Vcap upon charge/discharge is equal to the sum of the voltage Vc of the capacitance of the capacitor 19 corresponding to the charge rate of the capacitor 19 at the time of charge/discharge and the above voltage drop (Vcap=Vc+Rc·IC). Thus, in the case where the capacity of the capacitor 19 is reduced, the capacitor voltage Vcap may change (increase) substantially and exceed the DC bus voltage Vdc when a charge current or a discharge current flows into the capacitor 19.

The DC bus voltage Vdc is generated by raising the capacitor voltage Vcap using the up-down voltage converter 100. Thus, for control purposes, the DC bus voltage Vdc should always be higher than the capacitor voltage Vcap. In other words, the capacitor voltage Vcap should be lower than the DC bus voltage Vdc. However, when the charge/ discharge current flows into the capacitor 19 as described above and the capacitor voltage Vcap substantially increases to exceed the DC bus voltage Vdc, the up-down voltage converter 100 may be unable to properly control the DC bus voltage Vdc. Particularly, in a case where regenerative power is generated at the turning motor 21 or the boom regeneration motor 300, a large charge current may flow into the capacitor 19 and the capacitor voltage Vcap may exceed the DC bus voltage Vdc as a result.

Accordingly, in the present embodiment, a target value Vdct for the DC bus voltage is raised before a large amount of regenerative power is generated. In this way, even when a charge current from the regenerative power flows into the capacitor 19, the capacitor voltage Vcap may be prevented from exceeding the DC bus voltage Vdc. Note that although the turning motor 21 and the boom regeneration motor 300 are illustrated as regenerative power generating means in the drive system of FIG. 2, the drive system does not necessarily have to include both of these motors. That is, in the present embodiment, the capacitor voltage Vcap is prevented from exceeding the DC bus voltage Vdc by arranging the DC bus voltage target value Vdct to be variable depending on the capacitor voltage and the capacitor current.

Figure 5:
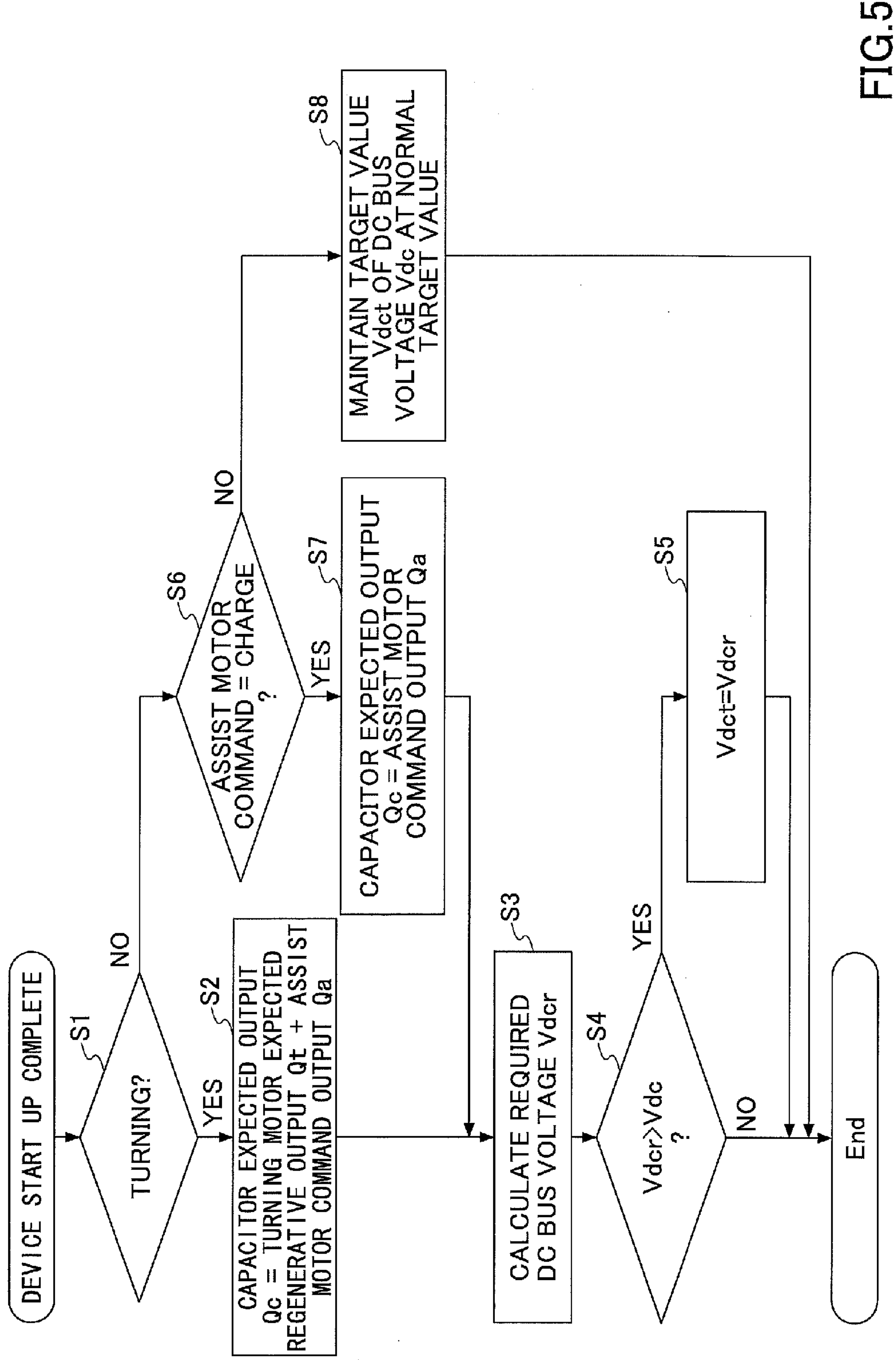
FIG. 5 is a flowchart illustrating a DC bus voltage variable control process.
Figure 6:
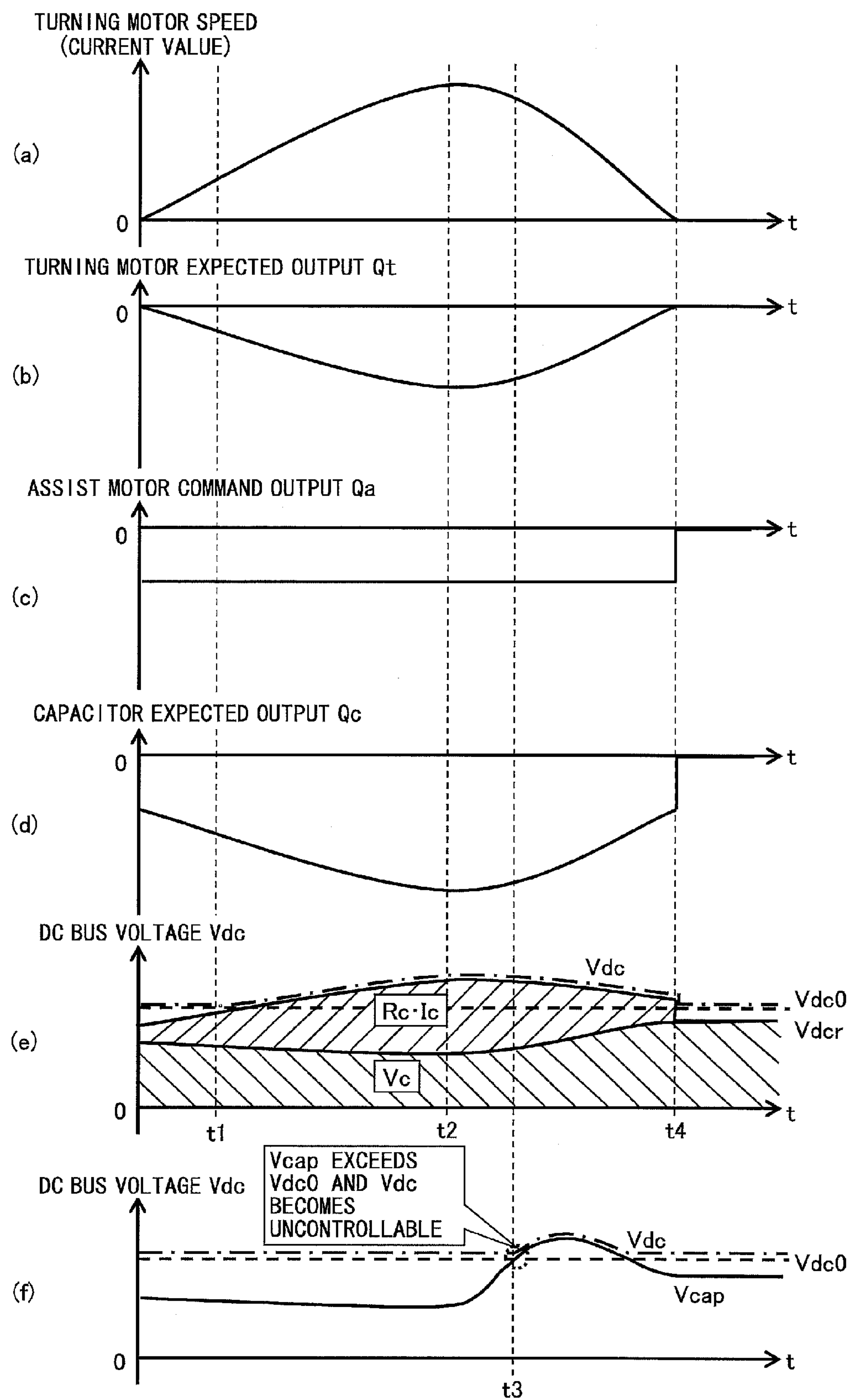
FIG. 6 is a time chart illustrating changes in various control elements of the DC bus voltage variable control process.

In the following, a DC bus voltage variable control process according to an embodiment of the present invention is described with reference to FIGS. 5 and 6. FIG. 5 is a flowchart illustrating the DC bus voltage variable control process according to the present embodiment. FIG. 6 is a time chart illustrating changes in control elements of the DC bus voltage variable control process.

The DC bus voltage variable control process illustrated in FIG. 5 may be performed by a control unit such as the controller 30, for example. Note, however, that the control unit that performs the DC bus voltage variable control process is not limited to the controller 30. In other embodiments, a dedicated control unit having a configuration similar to that of the controller 30 may be positioned to cooperate with the controller 30. In the present embodiment, as illustrated in FIG. 2, the controller 30 includes an estimated regenerative energy computing part, an energy storage target value determining part, and an energy storage target value control part that are configured to cooperatively execute the following process steps.

When startup operations of the control unit and the drive system of the engine are completed and operation of the hybrid excavator is started, in step S1, the controller 30 determines whether the upper turning body 3 is turning. The upper turning body 3 is driven by the turning motor 21. In the present embodiment, the turning motor 21 also acts as a generator. That is, upon decelerating the turning motion of the upper turning body 3, the turning motor 21 performs a regeneration operation for generating electric power. The electric power obtained by the regeneration operation of the turning motor 21 is supplied and charged to the capacitor 19 via the DC bus 110 and the up-down voltage converter 100.

If it is determined in step S1 that the upper turning body 3 is turning (step S1, YES), the process proceeds to step S2. In step S2, the estimated regenerative energy computing part of the controller 30 computes a turning motor expected regenerative output Qt that is expected to be obtained from collecting the turning energy of the upper turning body 3 as electric power. That is, the turning motor expected regenerative output Qt corresponds to the regenerative power expected to be obtained by the turning motor 21 when the turning drive operation of the turning motor 21 for turning the upper turning body 3 is stopped and switched to a regeneration operation. The estimated regenerative energy computing part of the controller 30 computes the turning motor expected regenerative output Qt based on the turning speed of the turning motor 21.

Assuming regenerative power is generated only by the turning motor 21, a capacitor expected output Qc as the electric power expected to be output to the capacitor 19 may be equal to the sum of the turning motor expected regenerative output Qt and an assist motor command output Qa. That is, as illustrated in FIGS. 6 (*b*), (*c*), and (*d*), the capacitor expected output Qc corresponds to the combined output of the turning motor expected regenerative output Qt and the assist motor command output Qa.

Note that in the example illustrated in FIG. 5, it is assumed that regenerative power is generated only by the turning motor 21. However, in other examples, when the boom 4 is being driven, the boom regeneration motor 300 may perform regeneration (power generation). In this case, assuming the power expected to be obtained by the boom regeneration motor 300 upon performing regeneration is referred to as "boom expected regenerative output Qb", the estimated regenerative energy computing part of the controller 30 may compute the capacitor expected output Qc by obtaining the sum of the turning motor expected regenerative output Qt and the boom expected regenerative output Qb.

After the process of step S2 is completed, the process proceeds to step S3. In step S3, the energy storage target value determining part of the controller 30 calculates a required DC bus voltage Vdcr based on the capacitor voltage Vc and the internal resistance Rc (current value) of the capacitor 19, and the computed turning motor expected regenerative output Qt. The required DC bus voltage Vdcr is calculated to prevent the DC bus voltage Vdc from falling below the capacitor voltage Vc of the capacitor 19 so that the DC bus voltage Vdc may be properly controlled.

Assuming all the turning motor expected regenerative output Qt is supplied and charged to the capacitor 19, a capacitor current Ic according to the turning motor expected regenerative output Qt flows through the capacitor 19. The capacitor current Ic may be expressed by the following formula: $Ic=Qt/(Vc-Rc\cdot Ic)$. In the above formula, $Rc\cdot Ic$ represents a voltage drop caused by the internal resistance Rc of the capacitor 19. Also, note that the capacitor current Ic corresponds to a charge current and is represented by a negative value. Accordingly, the capacitor voltage Vcap of the capacitor 19 while being charged corresponds to a value obtained by dividing the turning motor expected regenerative output Qt by the capacitor current Ic corresponding to the charge current ($Vcap=Vc-Rc\cdot Ic$), and this value corresponds to the required DC bus voltage Vdcr ($Vdcr=Vc-Rc\cdot Ic$).

After the required DC bus voltage Vdcr is calculated in step S3, in step S4, the energy storage target value control part of the controller 30 determines whether the required DC bus voltage Vdcr is greater than the current DC bus voltage Vdc.

If the required DC bus voltage Vdcr is not greater than the current DC bus voltage Vdc; i.e., if the current DC bus voltage Vdc is greater than the required DC bus voltage Vdcr (step S4, NO), this means that even if the charge current Ic according to the turning motor expected regenerative output Qt flows through the capacitor 19 and thereby causes an increase in the capacitor voltage Vc, the capacitor voltage Vc would not exceed the DC bus voltage Vdc and the DC bus voltage Vdc would still be a higher value than the capacitor voltage Vc. Thus, in this case, the up-down voltage converter 100 may be capable of properly controlling the DC bus voltage Vdc. Accordingly, the energy storage target value control part of the controller 30 ends the process without changing the DC bus voltage target value Vdct.

On the other hand, if it is determined in step S4 that the required DC bus voltage Vdcr is greater than the current DC bus voltage Vdc (step S4, YES), this means that the capacitor voltage Vc may potentially exceed the DC bus voltage Vdc when the charge current Ic according to the turning motor expected regenerative output Qt flows through the capacitor 19 and thereby causes an increase in the capacitor voltage Vc. In such a case, the up-down voltage converter 100 may be unable to properly control the DC bus voltage Vdc, and therefore, the DC bus voltage Vdc has to be raised. Accordingly, the process proceeds to step S5 where the energy storage target value control part of the controller 30 sets the DC bus voltage target value Vdct for the DC bus voltage Vdc equal to the required DC bus voltage Vdcr.

Also, when it is determined in step S1 that the upper turning body 3 is not turning (step S1, NO), the process proceeds to step S6. In step S6, a determination is made as to whether the motor generator 12 (assist motor) command output Qa corresponds to a charge power to be charged to the capacitor 19. As illustrated in FIG. 6 (*c*), if the motor generator 12 (assist motor) command output Qa corresponds to a charge power to be charged to the capacitor 19 (step S6, YES), the process proceeds to step S7.

In step S7, the energy storage target value determining part of the controller 30 calculates the output value of the assist motor command output Qa as the capacitor expected output Qc. After the energy storage target value determining part calculates the capacitor expected output Qc in step S7, the process proceeds to step S3 and process steps identical to those described above are performed.

On the other hand, if it is determined in step S6 that the motor generator 12 (assist motor) command output Qa does not correspond to a charge power to be charged to the capacitor 19 (step S6, NO), the process proceeds to step S8.

If it is determined in step S1 that the upper turning body 3 is not turning and it is determined in step S6 that the motor generator 12 (assist motor) command output Qa does not correspond to a charge power to be charged to the capacitor 19, this means that no charge power to the capacitor 19 is being generated. Accordingly, in step S8, the energy storage target value control part of the controller 30 does not change the DC bus voltage target value Vdct for the DC bus voltage Vdc but leaves the DC bus voltage target value Vdct set to a normal target value (target value that is normally set up for the DC bus voltage Vdc). That is, because no power is charged to the capacitor 19, no charge current flows through the capacitor 19, and therefore, the capacitor voltage Vcap is not expected to exceed the DC bus voltage Vdc. Thus, the energy storage target value control part of the controller 30 determines it unnecessary to raise the DC bus voltage Vdc.

In the following, changes in the DC bus voltage Vdc during the above-described DC bus voltage variable control process are described with reference to FIG. 6. FIG. 6 (*a*) is a graph illustrating the turning speed of the turning motor 21. The turning motor expected regenerative output Qt is obtained by multiplying the current speed of the turning motor 21 (turning speed) by a regeneration braking torque (pre-set value). As illustrated in FIG. 6 (*b*), the turning motor expected regenerative output Qt is proportional to the speed of the turning motor 21. Note that in the present example, power discharged from the capacitor 19 is represented by a positive value and power charged to the capacitor 19 is represented by a negative value. Accordingly, the turning motor expected regenerative output Qt is represented by a negative value in FIG. 6 (*b*). FIG. 6 (*e*) is a graph illustrating a temporal change in the DC bus voltage Vdc when the DC bus voltage variable control process of the present embodiment is performed. FIG. 6 (*f*) is a graph illustrating a temporal change in the DC bus voltage Vdc in a case where the DC bus voltage variable control process of the present embodiment is not performed.

As illustrated in FIG. 6 (*a*), the turning speed of the turning motor 21 starts increasing from time t=0, passes time t1, peaks at time t2, then passes time t3, and reaches zero at time t4. Between time points t=0 to t4, the turning motor expected regenerative output Qt increases and decreases in proportion to the speed of the turning motor 21. Note that the turning motor expected regenerative output Qt corresponds to a charge power and is therefore represented by a negative value.

In the example illustrated in FIG. 6, while a charge command in the form of an assist motor command is issued as illustrated in FIG. 6 (*c*), steps S1 through S6 of the DC bus voltage variable control process of FIG. 5 are performed so that the process may proceed to step S7. In step S7, the capacitor expected output Qc is calculated by obtaining the sum of the turning motor expected regenerative output Qt and the assist motor command output Qa as illustrated in FIG. 6 (*d*).

FIG. 6 (*e*) illustrates a change in the capacitor voltage Vcap while the charge current Ic flows through the capacitor 19; i.e., a change in the required DC bus voltage Vdcr. Note that in FIG. 6 (*e*), a normal DC bus voltage Vdc0 is represented by a dashed line, and the DC bus voltage Vdc is represented by a dashed-dotted line. After the time t=0, charging is started by the power generating operation of the motor generator 12 (assist motor), but power is consumed by the acceleration of the turning motor 21, and as a result, the voltage Vc of the capacitance of the capacitor 19 gradually decreases. However, as the capacitor expected output Qc increases, the charge current Ic to the capacitor 19 also increases. As a result, at time t1, the required DC bus voltage Vdcr reaches the normal DC bus voltage Vdc0. The normal DC bus voltage Vdc0 corresponds to a voltage value normally set up for the DC bus when the DC bus voltage variable control process is not performed. Up until time t1, the capacitor voltage Vcap is lower than the DC bus voltage Vdc, and therefore, the up-down voltage converter 100 may be able to properly control the DC bus voltage Vdc. Thus, up until time t1, the DC bus voltage target value Vdct of the DC bus voltage Vdc is set equal to the normal target value.

After time t1, the capacitor voltage Vcap becomes higher than the normal DC bus voltage Vdc0. Accordingly, when the charge current Ic flows through the capacitor at this time, the up-down voltage converter 100 may be unable to operate properly. Thus, in step S5 of FIG. 5, the DC bus voltage target value Vdct is changed to the required DC bus voltage Vdcr, which is equal to the capacitor voltage Vcap. In this way, discharge by the capacitor 19 may be controlled by the up-down voltage converter 100 and the DC bus voltage Vdc may be raised. Accordingly, even when the charge current Ic flows through the capacitor 19 and the capacitor voltage Vcap increases as a result, the capacitor voltage Vcap may be prevented from exceeding the DC bus voltage Vdc. Note that although discharge control by the up-down converter 100 is used in the above embodiment as an exemplary method of raising the DC bus voltage Vdc, in other embodiments, power generated by the motor generator 12 through control operations by the inverter 18A may be used, for example.

At time t2, when the turning motor 21 starts decelerating, the turning motor 21 switches to power generation mode to generate regenerative power. As a result, a large charge current flows through the capacitor 19 thereby causing an increase in the capacitor voltage Vcap. However, because the DC bus voltage target value Vdct is set equal to the required DC bus voltage Vdcr at time t1, the DC bus voltage Vdc is raised to an adequately high value. Thus, the capacitor voltage Vcap may be prevented from exceeding the DC bus voltage Vdc, and the up-down voltage converter 100 may operate properly. Note that the computation for obtaining the required DC bus voltage Vdcr may continue to be performed even after time t2 in consideration of the fact that the output of the assist motor may change after time t2.

As illustrated in FIG. 6 (*f*), when the DC bus voltage variable control process of the present embodiment is not performed, after time t2, the capacitor voltage Vcap increases as a result of the supply of regenerative power of the turning motor 21 while the DC bus voltage Vdc remains constant. Note that in FIG. 6 (*f*), the normal DC bus voltage Vdc0 is represented by a dashed line, and the DC bus voltage Vdc is represented by a dashed-dotted line. As illustrated, owing to the regenerative power of the turning motor 21, the capacitor voltage Vcap exceeds the DC bus voltage Vdc at time t3. This in turn prevents the up-down voltage converter 100 from being able to properly control the DC bus voltage Vdc.

By implementing the DC bus voltage variable control process of the present embodiment, the DC bus voltage Vdc may be raised and maintained at an adequately high value as described above so that the capacitor voltage Vcap may be prevented from exceeding the DC bus voltage Vdc and the up-down voltage controller 100 may properly control the DC bus voltage Vdc.

At time t4, the drive operation of the turning motor 21 is stopped, the capacitor expected output Qc becomes zero, and the required DC bus voltage Vdcr falls below the normal DC bus voltage Vdc0. Accordingly, after time t4, normal control operations are resumed and the DC bus voltage Vdc is set equal to the normal DC bus voltage Vdc0.

As can be appreciated from the above, according to an aspect of the present embodiment, during operations in which a relatively large amount of regenerative power is expected to be generated such as turning operations of a turning body or drive operations of a boom, for example, the DC bus voltage target value is raised to a higher value so that the actual DC bus voltage may be raised. That is, according to an aspect of the present invention, a voltage difference between the DC bus voltage and the capacitor voltage that is preferably secured for safely performing regeneration is obtained based on the current value of the capacitor voltage, the internal resistance of the capacitor, and the expected regenerative power output, and the DC bus voltage is changed based on the obtained voltage difference.

Also, according to another aspect of the present embodiment, when the motor generator (assist motor) is generating power, the charge power to be charged to the capacitor is calculated, and a voltage difference between the DC bus voltage and the capacitor voltage that is preferably secured for safely performing regeneration is obtained based on the current value of the capacitor voltage, the internal resistance of the capacitor, and the charge power. In turn, the DC bus voltage target value is determined based on the voltage difference, and the actual DC bus voltage is changed based on the voltage difference.

Also, according to another aspect of the present embodiment, when no regenerative power is being generated, and the assist motor is not generating power, the DC bus voltage target value is controlled such that the voltage difference between the DC bus voltage and the capacitor voltage may be as small as possible without allowing the capacitor voltage to exceed the DC bus voltage even when an electric load is driven by power discharged from the capacitor. In this way, the voltage conversion efficiency of the up-down voltage converter may be improved.

Although the present invention is described above with reference to illustrative embodiments, the present invention is not limited to the embodiments described above, and numerous variations and modifications may be made without departing from the scope of the present invention.

What is claimed is:

1. A hybrid excavator comprising:

a lower running body;

an upper turning body that is positioned on the lower running body;

a boom including one end that is rotatably attached to the upper turning body;

an engine that is positioned at the upper turning body;

a motor generator that is positioned at the upper turning body and is configured to perform an assist operation for the engine and an electric power generating operation using the engine;

a motor generator control part that is configured to control the motor generator in response to a switching control signal supplied from a control unit;

a first electrical energy storage device that is positioned at the upper turning body;

a second electrical energy storage device that is positioned at the upper turning body and is electrically connected to the motor generator control part;

a charge/discharge control part that is positioned at the upper turning body and is configured to control a charge/discharge operation between the first electrical energy storage device and the second electrical energy storage device in response to an externally supplied control command signal;

a motor that is positioned at the upper turning body and is electrically connected to the second electrical energy storage device, the motor being configured to perform a regeneration operation for generating electric energy from mechanical energy and store the electric energy generated by the regeneration operation in the second electrical energy storage device; and the control unit that is configured to supply a control signal to at least one of the motor generator control part and the charge/discharge control part;

wherein the control unit is configured to set a second electrical energy storage target value for the second electrical energy storage device to a higher value than a first electrical energy storage target value for the first electrical energy storage device during the regeneration operation performed by the motor, and wherein, during a period in which the motor performs a power running operation, the control unit sets the second electrical energy storage target value for the second electrical energy storage device to a higher value than a previous electrical energy storage target value for the second electrical energy storage device that is set up before the motor performs the power running operation.

2. The hybrid excavator as claimed in claim 1, wherein the control unit computes the second electrical energy storage target value for the second electrical energy storage device based on an estimated voltage drop value upon regeneration.

3. The hybrid excavator as claimed in claim 2, wherein the control unit computes the second electrical energy storage target value for the second electrical energy storage device during a period in which the motor performs a power running operation.

4. The hybrid excavator as claimed in claim 3, wherein the control unit continues to compute the second electrical energy storage target value for the second electrical energy storage device during a period in which the motor performs the regeneration operation.

5. The hybrid excavator as claimed in claim 1, wherein the control unit raises a voltage of the second electrical energy storage device in response to a discharge operation of the first electrical energy storage device.

6. The hybrid excavator as claimed in claim 1, wherein the control unit raises a voltage of the second electrical energy storage device in response to the electrical power generating operation of the motor generator.

7. The hybrid excavator as claimed in claim 1, wherein the motor is a boom regeneration motor and includes an angle detecting part for detecting an angle of the boom; and the control unit includes an estimated regenerative energy computing part for computing an estimated regenerative energy based on the angle of the boom detected by the angle detecting part.

8. The hybrid excavator as claimed in claim 1, wherein the motor is a turning motor and includes a turning speed detecting part for detecting a turning speed of the upper turning body; and the control unit includes an estimated regenerative energy computing part for computing an estimated regenerative energy based on the turning speed detected by the turning speed detecting part.

9. A method of controlling a hybrid excavator including a lower running body; an upper turning body that is positioned on the lower running body; a boom including one end that is rotatably attached to the upper turning body; an engine that is positioned at the upper turning body; a motor generator that is positioned at the upper turning body and is configured to perform an assist operation for the engine and an electric power generating operation using the engine; a motor generator control part that is configured to control the motor generator in response to a switching control signal supplied from a control unit; a first electrical energy storage device that is positioned at the upper turning body; a second electrical energy storage device that is positioned at the upper turning body and is electrically connected to the motor generator control part; a charge/discharge control part that is positioned at the upper turning body and is configured to control a charge/discharge operation between the first electrical energy storage device and the second electrical energy storage device in response to an externally supplied control command signal; and a motor that is positioned at the upper turning body and is electrically connected to the second electrical energy storage device, the motor being configured to perform a regeneration operation for generating electric energy from mechanical energy and store the electric energy generated by the regeneration operation in the second electrical energy storage device, the method comprising the steps of:

supplying a drive control signal to at least one of the motor generator control part and the charge/discharge control part; and setting a second electrical energy storage target value for the second electrical energy storage device to a higher value than a first electrical energy storage target value for the first electrical energy storage device during the regeneration operation performed by the motor, and wherein, during a period in which the motor performs a power running operation, the control unit sets the second electrical energy storage target value for the second electrical energy storage device to a higher value than a previous electrical energy storage target value for the second electrical energy storage device that is set up before the motor performs the power running operation.

10. The method as claimed in claim 9, further comprising:

computing the second electrical energy storage target value for the second electrical energy storage device based on an estimated voltage drop value upon regeneration.

11. The method as claimed in claim 10, further comprising:

computing the second electrical energy storage target value for the second electrical energy storage device during a period in which the motor performs a power running operation.

12. The method as claimed in claim 11, further comprising:

continuing the computation of the second electrical energy storage target value for the second electrical energy storage device during a period in which the motor performs the regeneration operation.

* * * * *